United States Patent

Warner et al.

[15] 3,698,057

[45] Oct. 17, 1972

[54] REVERSIBLE FIXTURE FOR POSITIONING MAGNETIC MEMORY CORES

[72] Inventors: Clifford George Warner, Abington; James Henry Kade, Norwood, both of Mass.

[73] Assignee: RCA Corporation

[22] Filed: June 10, 1971

[21] Appl. No.: 151,820

[52] U.S. Cl...........29/203 MM, 29/203 P, 29/203 V, 29/DIG. 44

[51] Int. Cl...........H05k 13/04

[58] Field of Search......29/203 MM, 203 V, 203 R, 203 P, 29/DIG. 44; 269/21

[56] References Cited

UNITED STATES PATENTS 2,782,574 2/1957 Copold..........29/DIG. 44

*Primary Examiner*—Thomas H. Eager
*Attorney*—H. Christoffersen

[57] ABSTRACT

A fixture for accurately positioning magnetic memory cores in an array has a top surface for receiving agitated magnetic cores and has a bottom surface for connection to a source of vacuum. The fixture comprises a flat rigid laminar metallic plate formed from a plurality of thin flexible sheets, having etched apertures, arranged in top, middle, and bottom groups, all bonded together in precise registry. The sheets of the top group and the sheets of the bottom group are the same in having rectangular apertures each dimensioned to receive a core edgewise to a depth of up to one-half of the outer diameter of the core. The sheets of the middle group have smaller apertures. The useful life of the fixture can be doubled by turning it over when the top surface becomes worn by the abrasive cores.

2 Claims, 6 Drawing Figures

INVENTORS
Clifford G. Warner and
James H. Kade
BY
Carl V. Olson
ATTORNEY

REVERSIBLE FIXTURE FOR POSITIONING MAGNETIC MEMORY CORES

BACKGROUND OF THE INVENTION

In the manufacture of magnetic core memory planes for use in computers, it is necessary to very accurately position a large number of magnetic cores on their edges so that row and column electrical wires can later be threaded through the array of cores. The number of cores in such a planar array may typically be about 64 thousand. The individual cores are made of sintered ferrite material formed into a donut shape and having very small dimensions such as an outer diameter of 16, 18 or 20 mils (milli-inches) and an axial thickness of from three to five mils. The accurate positioning of an array of magnetic cores is accomplished by means of a fixture, usually called a core loading mat, which has a top surface provided with sockets dimensioned to receive magnetic cores edgewise. The sockets in the core loading mat or plate have vacuum ports extending from the bottoms of the sockets through the plate to the bottom side thereof. The core loading mat or plate is mounted on a mechanical vibrator, quantities of magnetic cores are poured onto the top of the plate, and a source of vacuum is connected to the bottom side of the plate. The vibration of the plate causes the cores to bounce around in a random fashion. Whenever a core falls edgewise into a socket, the vacuum retains the core in the socket. When all the sockets contain cores, the excess cores are removed, and the positioned cores are removed from the loading plate by means of an adhesive-coated sheet which holds the cores on edge while wires are threaded through the rows and columns of cores.

The construction of a core loading plate is difficult because of the very small size of the magnetic cores, the very close spacing and extreme dimensional accuracy required of the core receiving sockets. The useful life of a core loading plate is limited because the magnetic cores are made of sintered ferrite, which is very hard and abrasive. For this reason, the plates are made of a hard metallic material such as stainless steel. Since the apertures are made by an electro-chemical etching process, and because apertures cannot be etched in thick sheets with perpendicular aperture walls, a core loading mat is made from a plurality of thin flexible metallic sheets having etched apertures, the sheets being all bonded together in precise registry. A more detailed description of the construction of a core loading plate may be found in U.S. Pat. No. 3,174,837, entitled "Laminar Mesh," and issued to Norman B. Mears on Mar. 28, 1965.

SUMMARY OF THE INVENTION

An improved core loading plate, which is a little more expensive to construct, but which has a double useful life, is constructed by laminating a member having etched core receiving apertures both above and below a central member having registered vacuum port apertures.

DETAILED DESCRIPTION OF THE DRAWING

Figure 1:
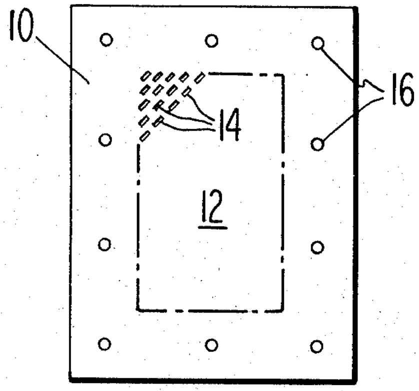
FIG. 1 is a plan view of the top surface of a memory core loading mat or plate.
Figure 2:
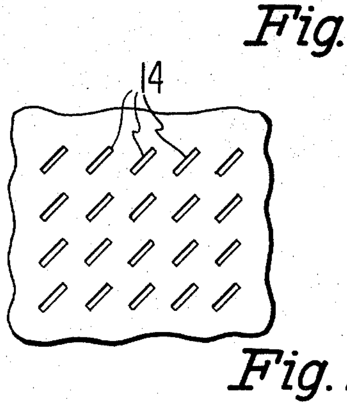
FIGS. 2, 3 and 4 are enlarged views of three different patterns of core sockets that may be employed in the plate of FIG. 1.
Figure 3:
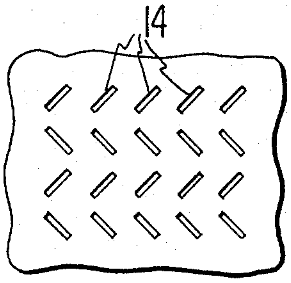
Figure 4:
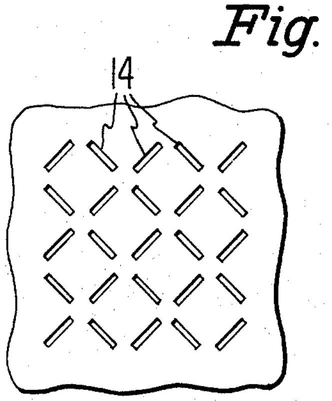

Reference is now made in greater detail to the drawing wherein FIG. 1 shows the top surface of a core loading mat or plate 10 having a central area 12 provided with a large number, such as 64 thousand, of core receiving sockets 14 arranged in rows and columns. The pattern of sockets 14 may for example be one of the patterns shown in FIGS. 2, 3 and 4. The plate 10 is constructed by laminating a number, such as 20, of thin flexible metallic sheets, as described in U.S. Pat No. 3,174,837, supra. The sheets are provided with etched apertures, and the sheets are assembled and laminated in precise registry by means of indexing holes 16.

Figure 5:
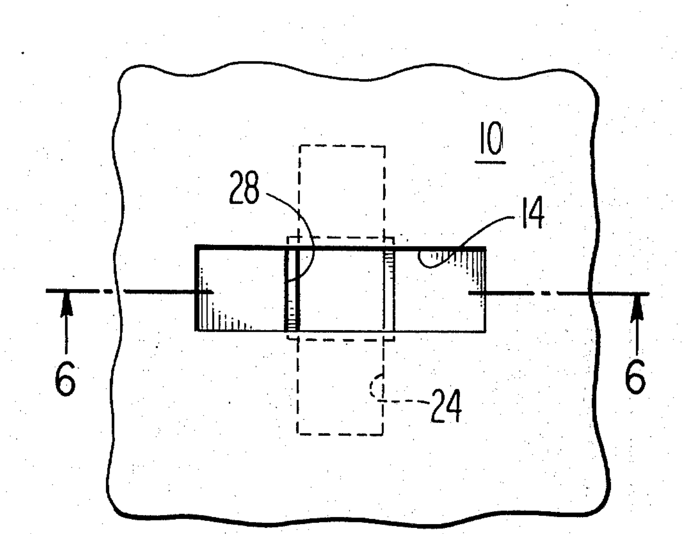
FIG. 5 is a further enlarged plan view of a portion of a core loading plate, constructed according to the teachings of this invention, showing an individual core receiving socket.
Figure 6:
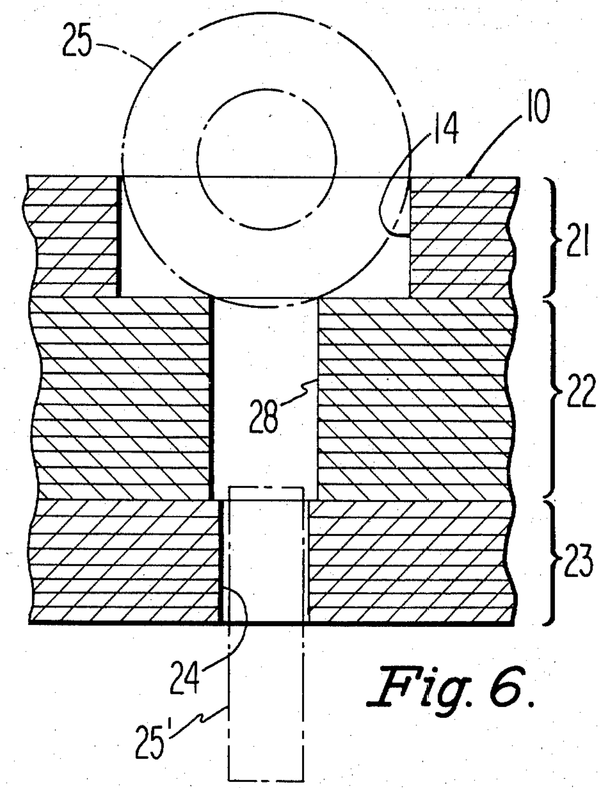
FIG. 6 is a fragmentary sectional view taken through the line 6—6 of FIG. 5.

FIGS. 5 and 6 show an individual core-receiving socket 14 formed in the top surface of a plate 10 by means of a member or group 21 of laminated metallic sheets all having identical registered rectangular apertures which form the socket 14. The thickness of the individual sheets and the number of sheets in group 21 are selected to provide a socket 14 dimensioned to receive a magnetic core 25 edgewise to a depth of up to one-half the outside diameter of the core.

The plate 10 includes a second or middle member or group 22 of laminated sheets each having identical registered apertures, which are approximately square and have dimensions on a side at least slightly larger than the axial thickness of the magnetic cores. The apertures form a vacuum port 28 in communication with the socket 14. The interface between groups 21 and 22 define the depth of the socket 14.

The plate 10 also includes a third member or group 23 of laminated sheets which may be identical in all respects with the group 21 of metallic sheets. Member 23 thus has sockets as at 24 dimensioned to receive a core 25'. The sheets of group 23 are turned over and turned around, as may be necessary, to ensure that the pattern of core receiving sockets 24 seen from the bottom side of the plate 10 is geometrically identical with the patterns of sockets 14 seen from the top side of plate 10. This requirement usually results in an orthogonal relationship as shown in FIG. 5 between the core receiving sockets 14 and 24 on the top and bottom sides of plate 10 when viewed from the top side. The vacuum port 28 provided by apertures in the sheets of group 22 provides vacuum communication between the sockets 14 and 24.

The individual sheets of groups 21, 22 and 23 may, for example, each be about three mils thick. A total of 20 sheets may be employed to construct a rigid laminated metallic 10 having a thickness of about 60 mils. All of the sheets of groups 21 and 23 may be identical and may be made by a photoetching process using the same graphic art work. Different art work is required for accomplishing the photoetching of the sheets of group 22. Therefore, the double-sided core receiving plate 10 is constructed from a greater number of the same sheets previously used in the prior art to construct a single-sided plate. The sheets of groups 21 and 23 must be etched to a greater precision than is necessary for the sheets of group 22. Therefore, the construction of a double-sided plate as shown is a little more expensive than a single-sided plate of equal thickness.

In use, the plate 10 is mounted on a vibrator with the sockets 14 uppermost and with a source of vacuum connected to the bottom side of the plate. A large number of cores are then poured onto the top surface of the plate 10. The random agitation of the cores results in their falling into the sockets 14 and being held therein by the action of the vacuum drawn through the vacuum ports 28 and the bottom sockets 24. When all of the sockets become occupied, the excess cores are removed and all of the precisely positioned cores are removed as a unit by means of an adhesive-coated sheet pressed against the exposed edges of the cores.

The agitation of the cores during the process of shaking them into the sockets 14 causes an abrasion of the corners of the sockets. The abrasion is severe because the cores are made of a sintered ferrite ceramic material which is very hard. The abrasion of the holes of the sockets 14 increase the sizes of the sockets until the plate is no longer capable of positioning the cores with the required degree of dimensional accuracy. When this occurs, it has been the practice to discard the plate 10 and replace it. The useful life of the plate 10, however, is effectively doubled by turning the plate over to use the sockets 24 to receive and position cores. When this is done, the vacuum is drawn through the vacuum port 28 and the worn socket 14.

The doubling of the useful life of a core positioning plate is of practical and economic importance because the plates are very expensive to construct with the required accuracy. The accuracy requirements can be expected to increase with the trend toward the use of ever smaller cores with ever closer spacing between the cores, in order to achieve faster read-write operation of the magnetic core memory constructed from the positioned cores.

What is claimed is:

1. A fixture for accurately positioning magnetic memory cores in an array and having a top surface for receiving agitated magnetic cores and having a bottom surface for connection to a source of vacuum, comprising a flat rigid laminar metallic plate formed from a plurality of thin flexible sheets arranged in top, middle, and bottom groups, all bonded together in precise registry, the top group of sheets and the bottom group of sheets each having a thickness when laminated equal to about one-half the outside diameter of said magnetic cores, and having rectangular apertures each dimensioned to receive a core edgewise to a depth of up to one-half of the outer diameter of the core, and the middle group of sheets having approximately square apertures each having dimensions on a side about equal to the thickness of said cores, whereby the useful life of the fixture can be doubled by turning it over when the top surface becomes worn.

2. A vacuum fixture for accurately positioning small articles in an array and having a top surface for receiving said articles and having a bottom surface for connection to a source of vacuum, comprising a metallic plate formed from top, middle, and bottom members bonded together in precise registry, the top member and the bottom member being the same and having apertures dimensioned to receive said articles, and the middle member having smaller apertures providing vacuum ports between respective apertures in the top and bottom members, whereby the fixture is reversible.

* * * * *